United States Patent [19]

Saeki et al.

[11] Patent Number: 5,572,412
[45] Date of Patent: Nov. 5, 1996

[54] POWER SUPPLY WITH HEATED PROTECTION DIODE

[75] Inventors: Mituo Saeki; Hidetoshi Yano, Kawasaki, both of Japan

[73] Assignee: Fujitsu Limited, Kawasaki, Japan

[21] Appl. No.: 452,375

[22] Filed: May 26, 1995

[30]     Foreign Application Priority Data

May 26, 1994  [JP]  Japan ................................. 6-112405

[51] Int. Cl.⁶ ................................................. H02M 3/335
[52] U.S. Cl. ............................................. 363/16; 323/276
[58] Field of Search ........................ 363/16, 50; 323/276

[56]                  References Cited

U.S. PATENT DOCUMENTS 4,320,349  3/1982  Freers et al. ............................... 330/66
4,791,380  12/1988  Chiappetta ............................... 307/310

OTHER PUBLICATIONS

High Performance Composite Device PCP 4/5 Series with partial English translation.
Sanyo Composite Device "PCP 4/ Series" New Product PCP 4/5 (F/P Series) Product List with partial English translation.

*Primary Examiner*—Stuart N. Hecker
*Attorney, Agent, or Firm*—Nikaido, Marmelstein, Murray & Oram LLP

[57]                ABSTRACT

A heating element, such as a switching transistor, a choke coil, or the like, contained in a power supply apparatus, is arranged in such a manner as to be thermally coupled to a diode inserted in series with a power supply line. The heating element heats up in operation, causing the diode temperature to rise and thereby reducing the diode forward voltage drop.

7 Claims, 4 Drawing Sheets

POWER SUPPLY WITH HEATED PROTECTION DIODE

BACKGROUND OF THE INVENTION

1. Field of the Invention

The present invention relates to a power supply apparatus, and more particularly to a power supply apparatus which uses a battery as a power source and is suitable as a power supply for a portable electronic apparatus such as a portable computer.

2. Description of the Related Art

In a power supply apparatus having a DC-DC converter for obtaining a regulated power supply of a desired voltage from an unregulated DC power supply, a diode is inserted in series with a power supply line to prevent current from flowing back from the output side. In an apparatus that permits connection of an AC adapter, as well as a battery, as an input to the DC-DC converter, a diode is inserted to prevent current from flowing into the battery from the AC adapter.

The diode inserted in series with the power supply line exhibits a given forward voltage drop $V_f$. Therefore, to make effective use of the battery and to ensure supply of the desired voltage despite a decrease in battery voltage, it is desirable that the diode forward voltage drop be reduced as much as possible. As a diode having a relatively small forward voltage drop $V_f$, an expensive Schottky barrier diode is known. Even this type of diode exhibits a forward voltage drop ranging from 0.3 to 1 V, and it is desirable that the voltage drop be further reduced, particularly for a power supply apparatus using a battery as a power source.

SUMMARY OF THE INVENTION

Accordingly, it is an object of the present invention to provide a power supply apparatus that can reduce the diode forward voltage drop $V_f$ with a simple construction.

According to the present invention, there is provided a power supply apparatus comprising: a heat-producing circuit element and a diode device thermally coupled to the heating element and connected in series with a power supply line.

DESCRIPTION OF THE PREFERRED EMBODIMENTS

Figure 1:
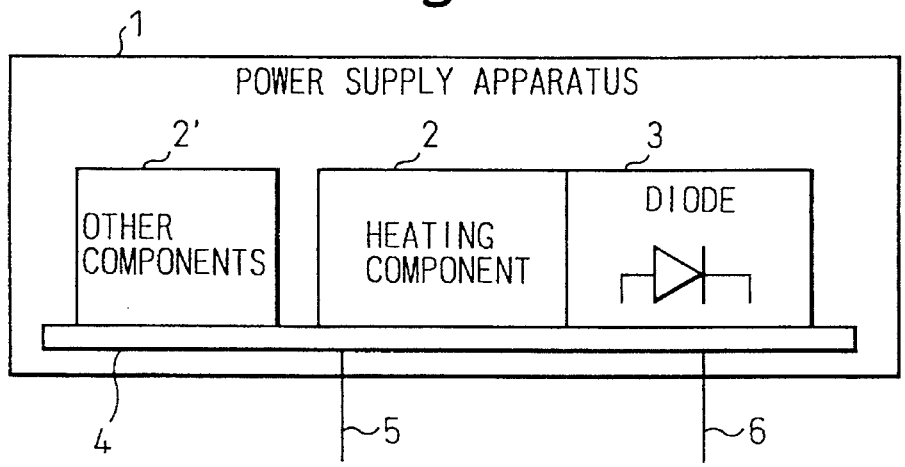
FIG. 1 is a diagram showing the basic construction of the present invention.

FIG. 1 is a diagram showing, in a simplified form, the basic construction of the present invention. In FIG. 1, a power supply apparatus 1 comprises a heating element 2, a diode 3, and other components 2', mounted on a circuit board 4. The reference numerals 5 and 6 designate output lines. In the embodiment shown in FIG. 1, the diode 3 is integral with the heating element 2 or is mounted in close proximity to the heating element 2 on the same surface of the circuit board 4 where the heating element 2 is mounted.

Figure 2:
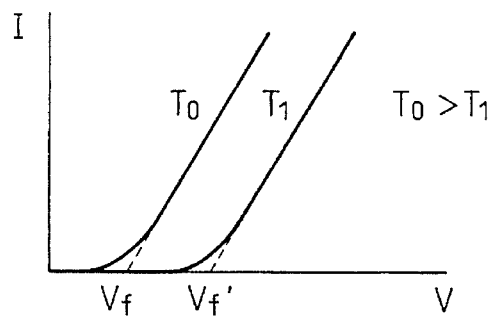
FIG. 2 is a graph showing the forward voltage-current characteristic of a diode.

FIG. 2 shows the temperature characteristic of the diode 3. In FIG. 2, the abscissa represents the voltage applied in the forward direction of the diode, and the ordinate represents the current that flows, in the forward direction, in the diode. The curve $T_0$ shows the voltage-current characteristic at temperature $T_0$, and the curve $T_1$ the voltage-current characteristic at temperature $T_1$, where $T_0 > T_1$. As shown in FIG. 2, the diode forward voltage drop $V_f$ at the higher temperature $T_0$ is smaller than the forward voltage drop $V_f$ at the lower temperature $T_1$.

In the apparatus construction shown in FIG. 1, the heating element 2 generates heat when the power supply apparatus 1 is in use. This causes the temperature of the diode 3 to rise, so that its forward voltage drop $V_f$ is reduced. Thus, according to the present invention, the forward voltage drop $V_f$ can be reduced with simple construction. This contributes to improving the efficiency of the power supply circuit and extending the battery life.

Figure 3:
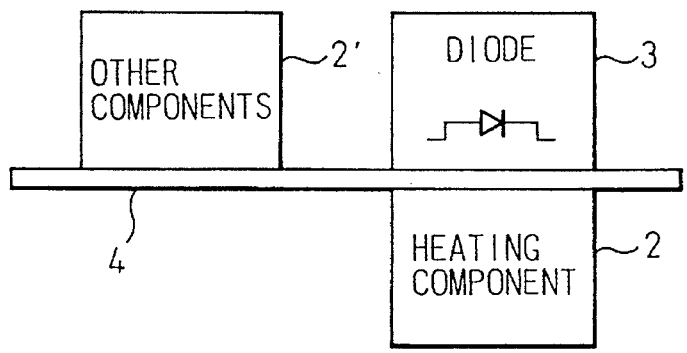
FIG. 3 is a diagram showing a modified example of the present invention.

In the construction shown in FIG. 1, the heating component 2 and the diode 3 are disposed on the same surface of the circuit board 4. In an apparatus constructed using surface-mount technology, it is possible to mount the heating component 2 on the surface opposite from the diode 3, as shown in FIG. 3, so that the heat from the heating component 2 can be transferred to the diode 3 via the circuit board 4.

The heating element 2 is, for example, a switching transistor, a choke coil, or the like contained in a DC-DC converter. The diode 3 is, for example, a switching diode inserted to prevent current from flowing back from the output side of the power supply apparatus 1. When the power supply apparatus 1 is constructed to permit the use of an AC adapter as well as a battery as an input to the DC-DC converter, the diode 3 is, for example, a diode inserted between the battery and the DC-DC converter to prevent current from flowing backward from the AC adapter to the battery.

Figure 4:
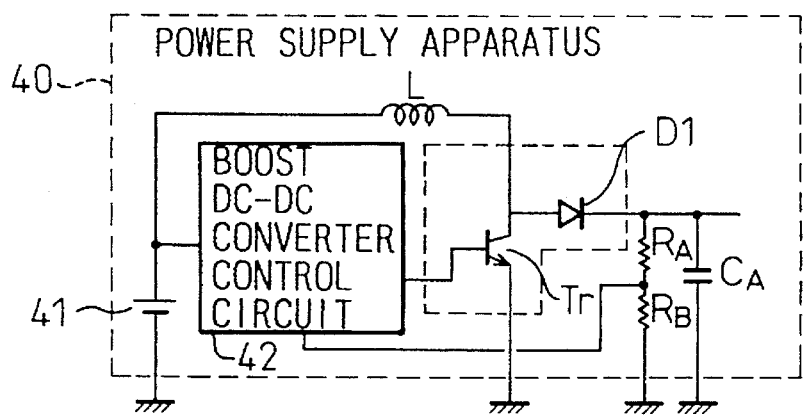
FIGS. 4 and 5 are diagrams showing a first embodiment of the present invention.

FIG. 4 shows an example in which the present invention is embodied in a power supply apparatus 40 which raises battery voltage by a boost DC-DC converter and uses it as a regulated power supply. The power supply apparatus 40 comprises a battery 41 and a boost DC-DC converter. The boost DC-DC converter includes a boost DC-DC converter control circuit 42, a choke coil L, a switching transistor Tr, a switching diode D1, resistors $R_A$ and $R_B$, and a smoothing capacitor $C_A$.

In the circuit shown in FIG. 4, the boost DC-DC converter control circuit 42 outputs a control signal which turns the transistor Tr on or off. When the switching transistor is ON, current from the battery 41 flows through the choke coil L and into the transistor Tr, so that energy is stored in the choke coil L. When the transistor Tr is OFF, current from the choke coil L flows through the diode D1 to the output side. The diode D1 acts to prevent current from flowing backward from the smoothing capacitor $C_A$ and the output side when the transistor Tr is ON. The resistors $R_A$ and $R_B$ divide the output voltage to produce a supervisory voltage. The boost DC-DC converter control circuit 42 changes the duty ratio of the control signal supplied to the transistor Tr so that the supervisory voltage produced by the resistors $R_A$ and $R_B$ is maintained at a prescribed value.

Figure 5:
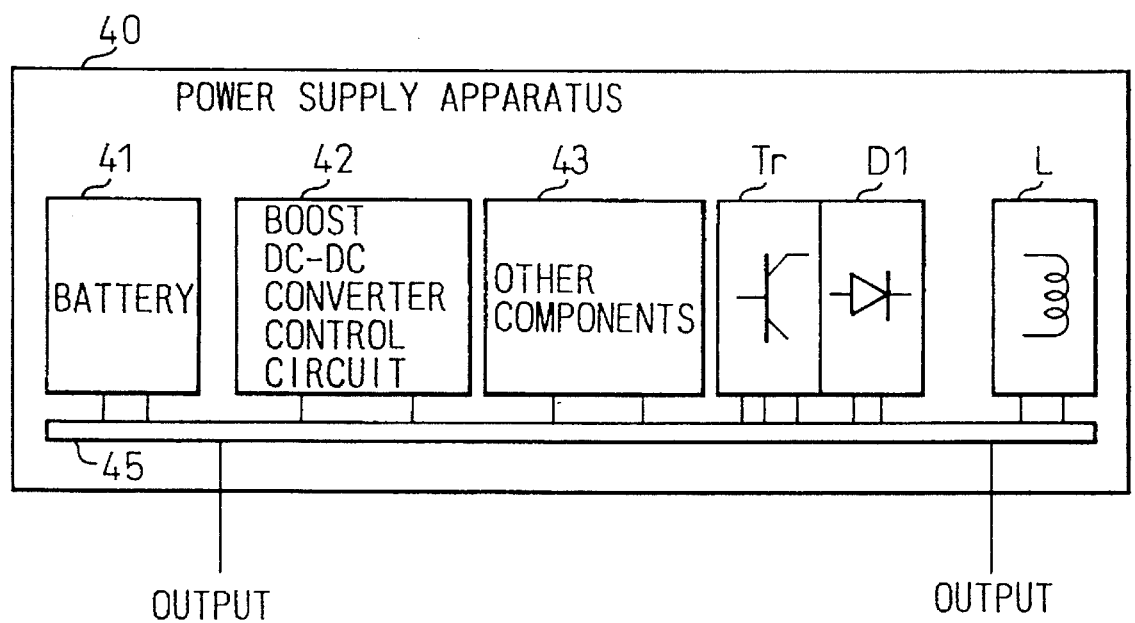

FIG. 5 shows the mounting of the various components of the power supply apparatus 40 having the circuit configuration shown in FIG. 4. In FIG. 5, the switching transistor Tr and the switching diode D1 are sealed either in the same package or in separate packages which are bonded together using an adhesive. Since the switching transistor Tr is a heating element, as the switching transistor Tr heats up in operation, the temperature of the switching diode D1 rises and its forward voltage drop $V_f$ is thus reduced. The switching diode D1 may be disposed close enough to the switching transistor Tr so that the temperature of the switching diode D1 rises sufficiently to reduce its forward voltage drop $V_f$ as the switching transistor Tr heats up. Further, since the choke coil L also heats up during operation, the choke coil L, instead of the transistor Tr, may be thermally coupled to the diode D1. When surface-mount technology is employed, as previously described, the transistor Tr or the choke coil L may be mounted on the reverse side directly opposite to the diode D1.

Figure 6:
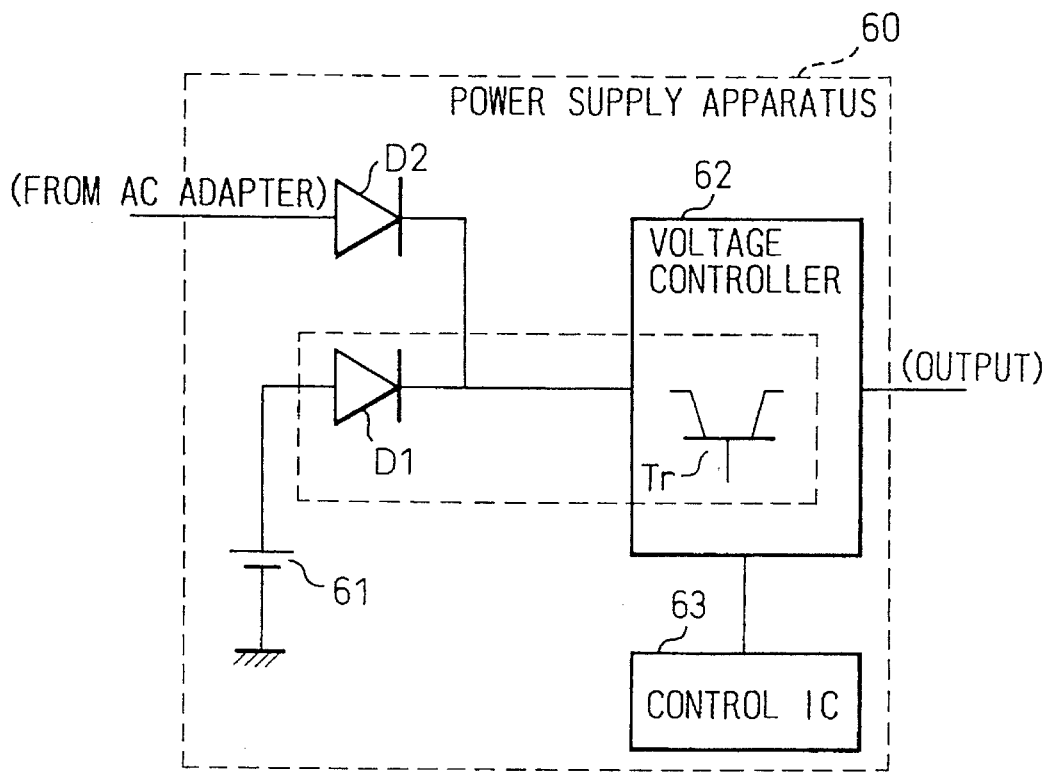
FIGS. 6 and 7 are diagrams showing a second embodiment of the present invention.
Figure 7:
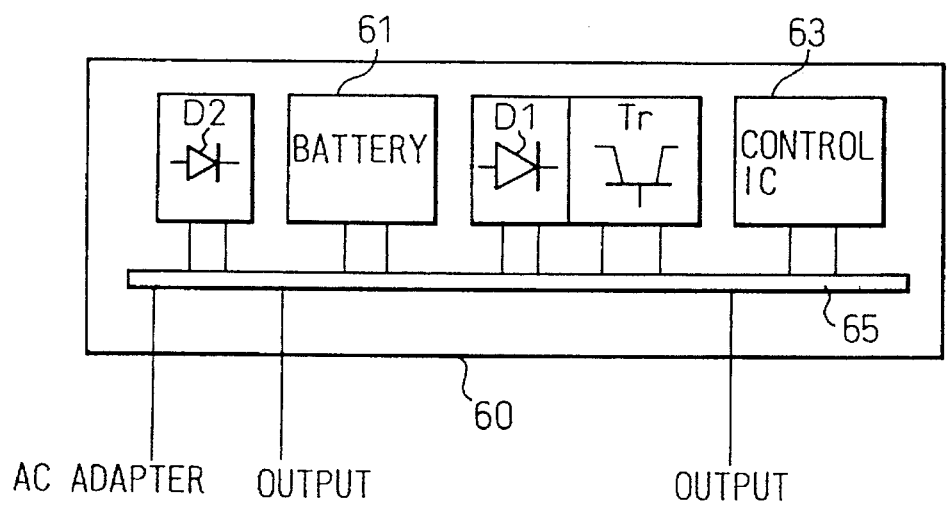

FIG. 6 shows an example in which the present invention is embodied in a power supply apparatus 60 which is designed to operate with an unregulates DC power supply from an AC adapter as well as from a battery. In FIG. 6, a DC-DC converter is constructed from a voltage controller 62 containing a switching transistor Tr, and a control IC 63 for controlling the switching transistor Tr. The DC-DC converter is designed to operate on direct current from an AC adapter (not shown) as well as from a battery 61. A diode D1 is provided to prevent the current from the AC adapter from flowing backward into the battery 61, while a diode D2 is provided to prevent the current from the battery 61 from flowing backward into the AC adapter. The components are mounted on a circuit board 65, as shown in FIG. 7. The diode D1 may be constructed integrally with the switching transistor Tr, or may be disposed in close proximity to it. The switching transistor Tr produces heat when the power supply apparatus is in operation. This causes the temperature of the diode D1 to rise, reducing its forward voltage drop $V_f$ and thus preventing the output voltage from dropping.

Figure 8:
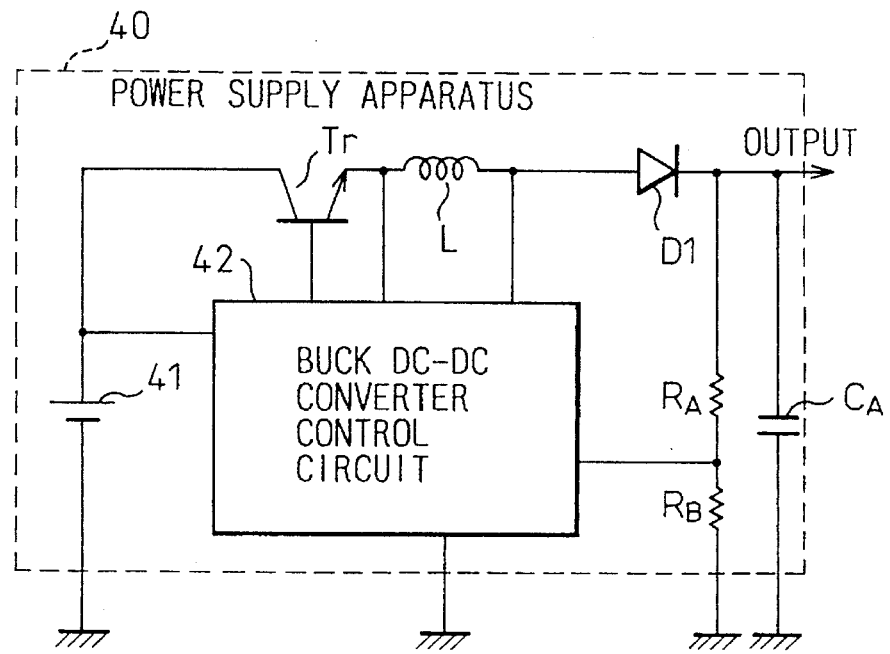
FIGS. 8 and 9 are diagrams showing a third embodiment of the present invention.
Figure 9:
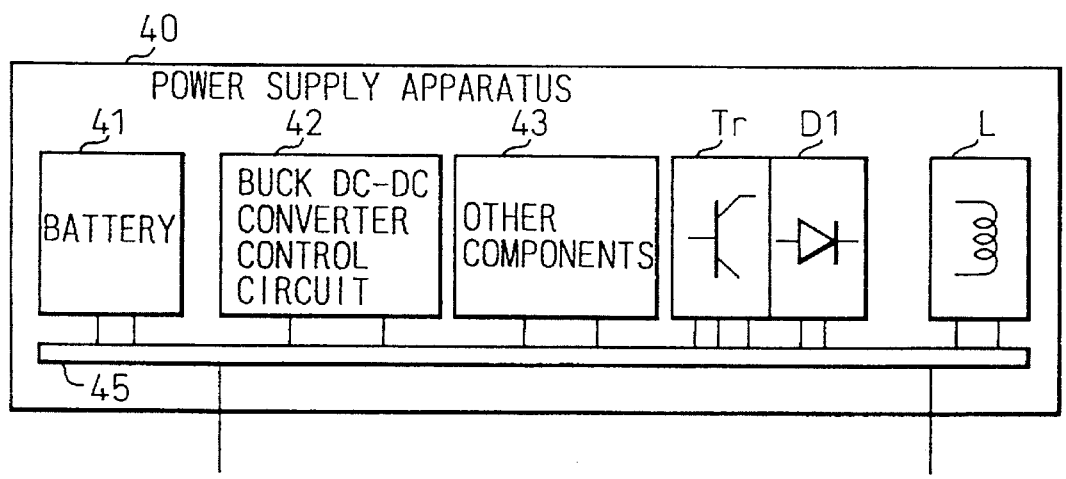

FIGS. 8 and 9 show an example in which the present invention is embodied in a power supply apparatus having a buck DC-DC converter. In FIG. 8, the power supply apparatus 40 comprises a battery 41 and a buck DC-DC converter. The buck DC-DC converter comprises a control circuit 42, a switching transistor Tr, a choke coil L, a diode D1, resistors $R_A$ and $R_B$, and a smoothing capacitor $C_A$.

In the case of the buck DC-DC converter also, the forward voltage drop $V_f$ of the switching diode D1 can be reduced by constructing it integrally with the switching transistor Tr, as shown in FIG. 9. Further, in the buck DC-DC converter, it may be so configured that the switching transistor Tr is placed in close proximity to the switching diode D1, as in the boost DC-DC converter.

The present invention has a feature such that a diode is placed in close proximity to a heating element. More specifically, a diode, which is serially connected to a battery and which is used for preventing current supplied from an AC adapter (an external power source) from flowing back into the battery, i.e., a diode which exists on an input side of a DC-DC converter and which is serially connected to a battery, is placed in close proximity to a heating element included in the DC-Dc conveter. Since the diode serially connected to the battery is placed in close proximity to the heating element, power loss due to a voltage drop in the diode is reduced, and therefore, the present invention provides a merit such that the battery can be efficiently used.

We claim:

1. A power supply apparatus comprising:

a battery a diode device, serially connected to the battery, for preventing current supplied from an external power source from flowing back into the battery, and a DC-DC converter supplied with one of first current through the diode device from the battery and second current from the external power source, said DC-DC converter includes a heating element, wherein said diode device is thermally coupled with the heating element included in said DC-DC converter.

2. A power supply apparatus comprising:

a heating element; and a diode device thermally coupled to said heating element and connected in series with a power supply line.

3. A power supply apparatus according to claim 2, further comprising a circuit board on which said heating element and said diode device are mounted, wherein said heating element and said diode device are placed in close proximity to each other on one surface of said circuit board.

4. A power supply apparatus according to claim 2, further comprising a circuit board on which said heating circuit element and said diode device are mounted, wherein said heating element is mounted on the surface of said circuit board corresponding and opposite to the surface thereof on which said diode device is mounted.

5. A power supply apparatus according to claim 2, wherein said diode device includes a diode for preventing current from flowing back into an input side of said power supply apparatus.

6. A power supply apparatus according to claim 2, wherein said heating element includes a switching transistor.

7. A power supply apparatus according to claim 2, wherein said heating element includes a choke coil.

* * * * *